US011277848B2

(12) United States Patent
Chae et al.

(10) Patent No.: US 11,277,848 B2
(45) Date of Patent: Mar. 15, 2022

(54) SYSTEM AND METHOD OF OPERATING MOBILE PLATFORMS

(71) Applicant: HANWHA DEFENSE CO., LTD., Changwon-si (KR)

(72) Inventors: Hee Seo Chae, Changwon-si (KR); Jae Hyuk Ju, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 106 days.

(21) Appl. No.: 16/559,766

(22) Filed: Sep. 4, 2019

(65) Prior Publication Data
US 2020/0296734 A1 Sep. 17, 2020

(30) Foreign Application Priority Data

Mar. 12, 2019 (KR) .................. 10-2019-0027875

(51) Int. Cl.
H04W 72/10 (2009.01)
H04W 4/40 (2018.01)
H04W 72/08 (2009.01)
H04W 4/70 (2018.01)
H04W 72/04 (2009.01)

(52) U.S. Cl.
CPC ............ H04W 72/10 (2013.01); H04W 4/40 (2018.02); H04W 72/0453 (2013.01); H04W 72/082 (2013.01)

(58) Field of Classification Search
None
See application file for complete search history.

(56) References Cited

U.S. PATENT DOCUMENTS

| 7,190,700 B2 | 3/2007 | Choi | |
| 7,986,660 B2 | 7/2011 | Ramos et al. | |
| 2008/0086236 A1* | 4/2008 | Saito | G06N 3/008 700/245 |
| 2009/0164638 A1* | 6/2009 | Jang | H04W 72/10 709/226 |
| 2009/0303938 A1 | 12/2009 | Kim et al. | |
| 2011/0235684 A1 | 9/2011 | Dahlman et al. | |
| 2014/0300826 A1* | 10/2014 | Funke | H04N 21/42204 348/734 |

(Continued)

FOREIGN PATENT DOCUMENTS

KR 10-0426357 B1 4/2004
KR 10-2007-0107449 A 11/2007

(Continued)

Primary Examiner — Jay L Vogel
(74) Attorney, Agent, or Firm — Sughrue Mion, PLLC

(57) ABSTRACT

Disclosed herein is an operating system for operating a plurality of mobile platforms. The operating system includes: an operating terminal configured to allocate a bandwidth to a channel of each of the mobile platforms according to a mission of each of the mobile platforms to perform, the channel being used for the operating terminal to perform communications with each of the mobile platforms; and the plurality of mobile platforms each of which is configured to receive the mission from the operating terminal, and send a request to adjust and reallocate the bandwidth to the channel based on performance information about the mobile platforms. It is possible to operate the plurality of mobile platforms efficiently by using a limited frequency band.

20 Claims, 11 Drawing Sheets

(56) References Cited

U.S. PATENT DOCUMENTS

| | | | |
|---|---|---|---|
| 2015/0148049 A1* | 5/2015 | Alberth, Jr. | H04W 72/042 |
| | | | 455/450 |
| 2015/0310747 A1* | 10/2015 | Frolik | G01S 13/87 |
| | | | 340/971 |
| 2016/0270088 A1* | 9/2016 | Martin | H04W 76/14 |
| 2017/0201461 A1* | 7/2017 | Cheng | H04L 47/286 |
| 2020/0112907 A1* | 4/2020 | Dao | H04M 15/83 |
| 2020/0272145 A1* | 8/2020 | Kinoshita | H04W 4/40 |
| 2021/0171158 A1* | 6/2021 | Solberg | H04L 12/4625 |

FOREIGN PATENT DOCUMENTS

| | | |
|---|---|---|
| KR | 10-2011-0002362 A | 1/2011 |
| KR | 10-1141603 B1 | 5/2012 |

\* cited by examiner

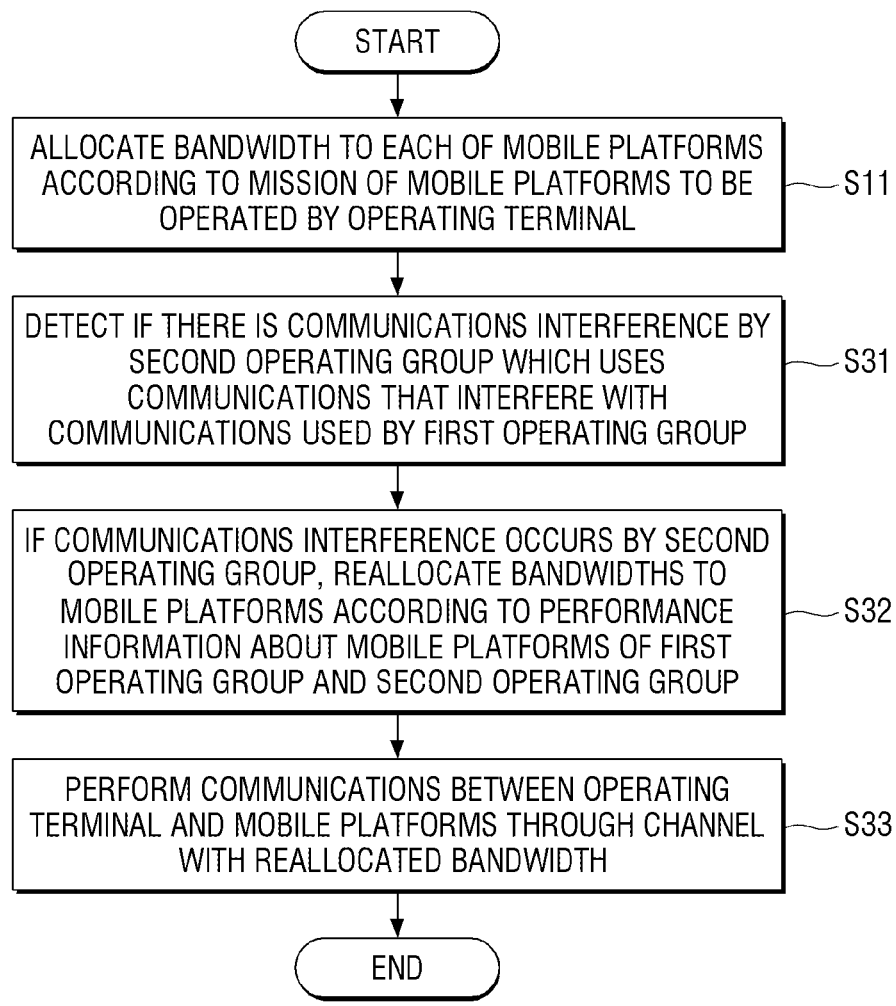

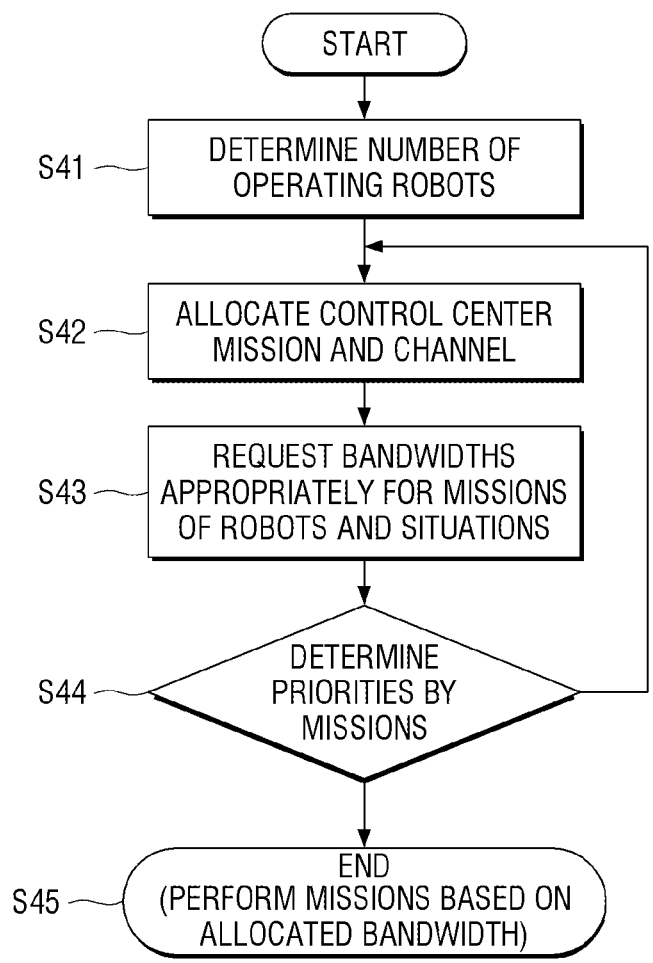

SYSTEM AND METHOD OF OPERATING MOBILE PLATFORMS

This application claims priority from Korean Patent Application No. 10-2019-0027875 filed on Mar. 12, 2019 in the Korean Intellectual Property Office, the disclosure of which is incorporated herein by reference in its entirety.

BACKGROUND

1. Field

Apparatuses and methods consistent with the exemplary embodiments of the inventive concept relate to an operating system for mobile platforms and a method of operating the same, and more particularly, to an operating system for mobile platforms and a method of operating the same by efficiently utilizing a limited frequency.

2. Description of the Related Art

When a single remote controlling device controls a plurality of mobile platforms, it is designed to set the bandwidth of the wireless communications devices within an allocated frequency and bandwidth to operate them. Video and data are transmitted within the allocated bandwidth, and the mobile platforms are controlled remotely. In the environment where the allocated frequency is limited, the bandwidth is divided into N channels, which is the number of mobile platforms, and the mobile platforms are controlled with allocated bandwidths.

However, when the number of mobile platforms to be controlled is large, there arises a problem that a sufficient bandwidth cannot be provided for every mobile platform.

SUMMARY

Exemplary embodiments of the inventive concept provide an operating system that operates a plurality of mobile platforms by efficiently using a limited frequency band.

The exemplary embodiments also provide a method of operating a plurality of mobile platforms by efficiently using a limited frequency band.

According to exemplary embodiments, there is provided an operating system that operates a plurality of mobile platforms installed on a plurality of vehicles, respectively, by using a limited frequency band, the operating system including: an operating terminal configured to allocate a bandwidth to a channel of each of the mobile platforms according to a mission of each of the mobile platforms to perform, the channel being used for the operating terminal to perform communications with each of the mobile platforms; and the plurality of mobile platforms each of which is configured to receive the mission from the operating terminal, and send a request to adjust and reallocate the bandwidth to the channel based on performance information about the mobile platforms.

The bandwidths may be reallocated differently to the channels of the mobile platforms according to priorities based on the performance information about the mobile platforms. The priorities may be generated and recorded in a priority table and transmitted to the mobile platforms from the operating terminal or may be stored in the operating terminal.

The performance information may include at least one of a type of the mission, a driving mode of a vehicle on which a mobile platform is installed, a current situation of the vehicle, and information on whether an event occurs with respect to the vehicle. If any of events occurs with respect to a mobile platform, the mobile platform may have the highest priority.

The mobile platforms may include a first mobile platform configured to receive performance information about the other mobile platforms, among the mobile platforms, and to send a request to adjust and reallocate bandwidths to channels of the mobile platforms according to the received perform information and perform information about the first mobile platform. The performance information may be transmitted between the mobile platforms by using a part of one of more of channels of the mobile platforms or by using a communication scheme different from a communication scheme of the operating terminal.

The operating terminal and a plurality of mobile platforms receiving missions from the operating terminal may form a first operating group, and the operating terminal may be configured to adjust and reallocate bandwidths to channels of the mobile platforms, respectively, based on the performance information about the mobile platforms of the first operating group and at least one another mobile platform of a second operating group which uses communications that interfere with communications used by the first operating group, if it is determined by at least one of the operating terminal and the mobile platforms of the first operating group that there is a communication interference by the second operating group. If the operating terminal or at least one of the mobile platforms of the first operating group detects an identifier different from the identifier of the first operating group, it may be determined that there occurs the communication interference by the second operating group.

According to exemplary embodiments, there is provided a method of operating a plurality of mobile platforms installed on a plurality of vehicles, respectively, by using a limited frequency band, the method including: allocating, by an operating terminal, a bandwidth to a channel of each of the mobile platforms according to a mission of each of the mobile platforms to perform; sending, by each of the mobile platforms, a request to adjust and reallocate the bandwidth to the channel to the operating terminal based on current performance information about the mobile platforms; and performing communications between the operating terminal and each of the mobile platforms through the channel having the reallocated bandwidth in response to the request.

Other particulars of the exemplary embodiments will be described in the detailed description with reference to the accompanying drawings. According to exemplary embodiments, at least following effects can be achieved:

According to an exemplary embodiment, it is possible to efficiently operate a plurality of mobile platforms within a limited wireless communications frequency band. In addition, it is possible to improve the reliability and operability of communications between the control center and the unmanned mobile platforms.

It should be noted that the effects of the exemplary embodiments are not limited to those described above and other effects will be apparent to those skilled in the art from the following descriptions.

BRIEF DESCRIPTION OF THE DRAWINGS

The above and other aspects and features will become more apparent by describing in detail exemplary embodiments thereof with reference to the attached drawings, in which:

FIGS. 9 to 11 are flowcharts for illustrating a method of operating a plurality of mobile platforms according to an exemplary embodiment.

DETAILED DESCRIPTION OF THE EMBODIMENTS

Figure 1:
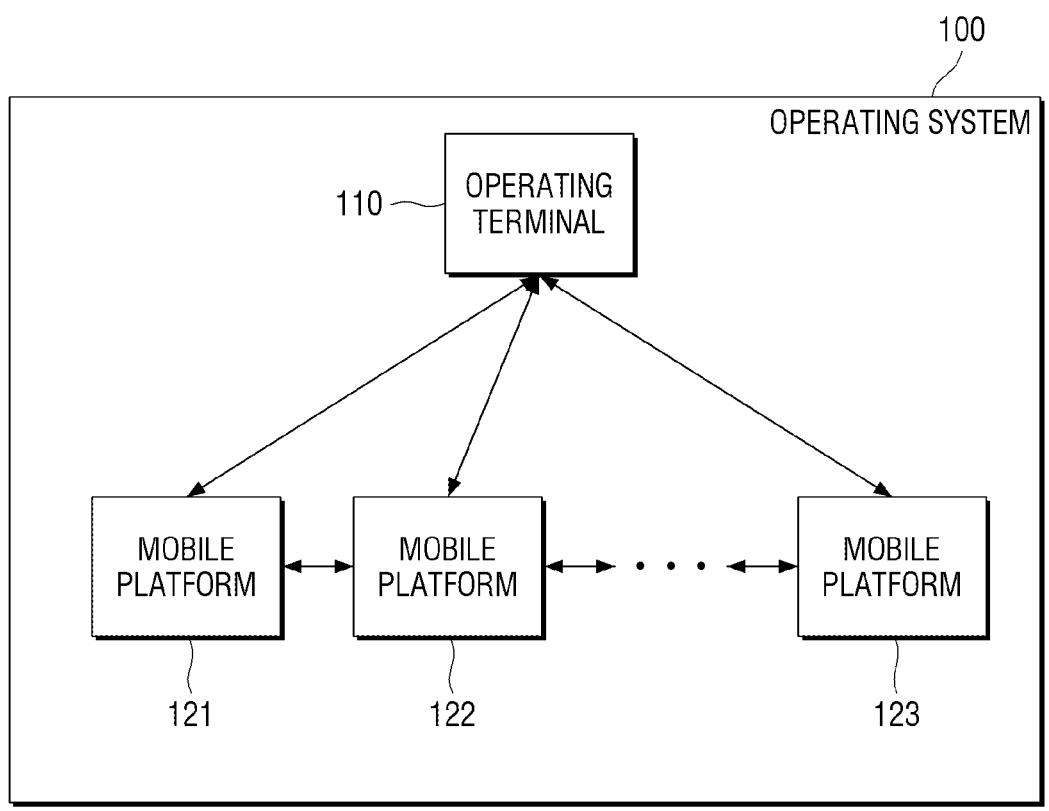
FIG. 1 is a block diagram of an operating system according to an exemplary embodiment.
Figure 2:
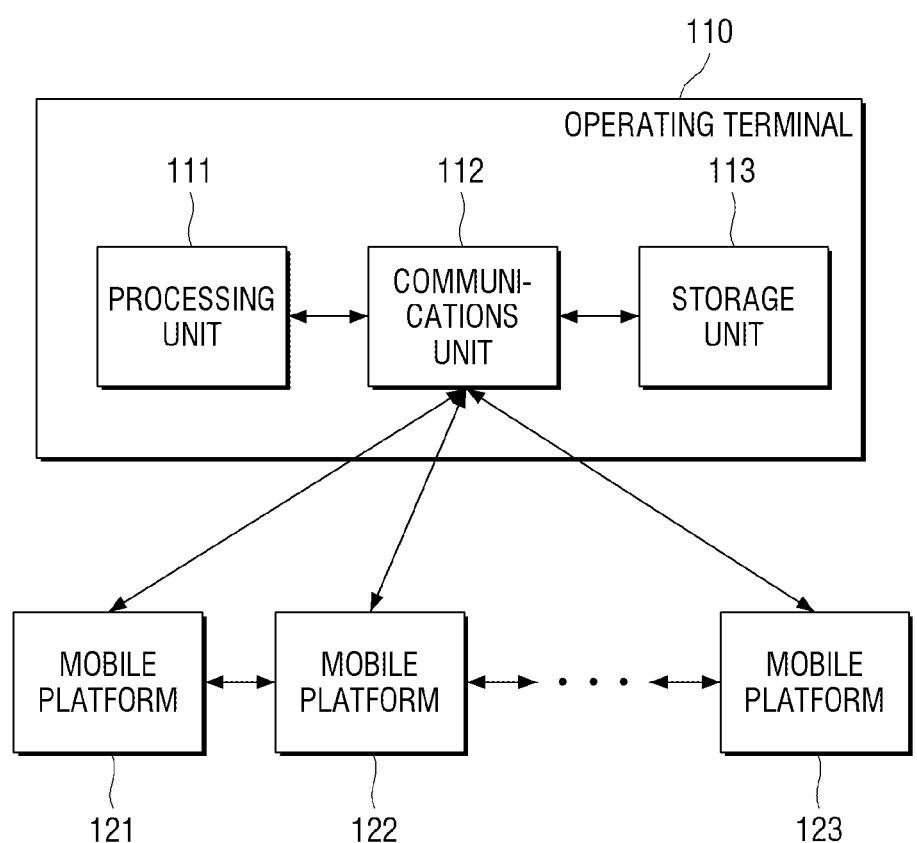
FIG. 2 is a block diagram of an operating terminal according to an exemplary embodiment.

Advantages and features of the inventive concept and methods to achieve them will become apparent from the descriptions of various embodiments herebelow with reference to the accompanying drawings. However, these embodiments are all exemplary, and thus, the inventive concept is not limited thereto disclosed herein but may be implemented in various different ways. The embodiments are provided for making the disclosure of the inventive concept thorough and for fully conveying the scope of the inventive concept to those skilled in the art. It is to be noted that the scope of the inventive concept is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the inventive concept. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

FIG. 1 is a block diagram of an operating system according to an embodiment.

An operating system 100 according to an embodiment includes an operating terminal 110 and a plurality of mobile platforms 121 to 123. The operating terminal 110 may include a processor 111, a communication interface 112, and a storage 113.

The processor 111 of the operating terminal 110 may be embodied as various numbers of hardware, software and/or firmware structures that execute respective functions described herein, according to an embodiment. For example, the processor may use a direct circuit structure, such as a memory, a processor, a logic circuit, a look-up table, etc. that may execute the respective functions through controls of one or more microprocessors or other controllers. Also, the processor may be specifically embodied by a module, a program, or a part of code, which contains one or more executable instructions for performing specified logic functions, and executed by one or more microprocessors or other controllers. Further, the processor may include or may be implemented by a specific central processing unit (CPU) that performs the respective functions, a microprocessor, or the like. Further, the communication interface 112 of the operating terminal 110 may include any one or any combination of a digital modem, a radio frequency (RF) modem, a WiFi chip, and related software and/or firmware. The storage 113 may include a plurality of memories.

In order to efficiently operate the mobile platforms 121 to 123 using a limited frequency band, the operating terminal 110 divides a bandwidth of the frequency band into a plurality of bandwidths and allocates the bandwidths to a plurality of channels of the mobile platforms 121 to 123, respectively, according to their missions, and conducts communications with the mobile platforms 121 to 123 through the channels.

The mobile platforms 121 to 123 are movable and may be mobile vehicles such as unmanned ground vehicles (UGVs) or unmanned aerial vehicles (UAVs). The mobile platforms 121 to 123 move with missions such as reconnaissance, strike, command control, explosive detection and removal, not being limited thereto. They can move either in an autonomous driving mode or in a remote-controlled driving mode. According to an embodiment, however, each of the mobile platforms 121 to 123 may refer to only a part of a mobile vehicle such as a communication device which is installed in the mobile vehicle and configured to communicate in a wired or wireless manner with the operating terminal 110 and/or another mobile platform which may also be a part of a mobile vehicle. In this case, each of the mobile platforms may include a processor, a communication interface, and a storage similar to the components constituting the operating terminal 110.

The processor 111 of the operating terminal 110 determines the mission of each of the mobile platforms 121 to 123 according to operation plans for the mobile platforms 121 to 123, and allocates the bandwidths to the channels of the mobile platforms according to their missions. The communication interface 112 transmits the missions to the mobile platforms 121 to 123 and controls the mobile platforms 121 to 123. In doing so, the bandwidth of the frequency band used by the mobile platforms 121 to 123 can be evenly distributed by dividing the bandwidth by the number of the mobile platforms 121 to 123. Specifically, a bandwidth B (an entire bandwidth)/N (the number of mobile platforms) may be allocated to a channel of each of N mobile platforms. Alternatively, the bandwidth may be allocated differentially according to importance of the mission or a required bandwidth. In particular, when an image requiring a large bandwidth is transmitted from a certain mobile platform, a greater portion of the bandwidth may be allocated to the channel of that mobile platform. For example, if a mobile platform 121 is an unmanned vehicle which has missions of reconnaissance and shooting, the shooting may have a higher priority than the reconnaissance, and a greater portion of the bandwidth may be allocated to the channel of the mobile platform 121 assigned the mission of shooting. In addition, depending on the driving mode of the mobile platforms 121 to 123, a greater portion of the bandwidth may be allocated to the channel of one of the mobile platforms 121 to 123 operating in the remote-controlled driving mode than another of the mobile platforms 121 to 123 operating in the autonomous driving mode.

The operating terminal 110 may further include a resource management system having frequency use authority and managing frequency resource sharing. The operating terminal 110 may further include a database for storing channel information about available frequency bands to provide the channel information about the frequency bands, and an SNR (signal-to-noise ratio) calculator for measuring and sharing a channel status. Accordingly, the operating terminal 110 may change channel allocation depending on the number of the mobile platforms 121 to 123 to be operated, and may change the mobile platform operation (transmission rate) as well.

The mobile platforms 121 to 123 receive missions from the operating terminal 110 to perform the missions, and send a request for reallocate a bandwidth for a corresponding channel to the operating terminal 110 according to current performance information about the mobile platforms 121 to 123.

Each of the mobile platforms 121 to 123 receives a mission given by the operating terminal 110 through the corresponding channel, and performs the mission. If it is necessary to adjust the bandwidth allocated for the channel according to the current performance information about at least one of the mobile platforms 121 to 123 during execution of the mission, a request to reallocate bandwidth may be sent to the operating terminal 110.

When the bandwidth allocated to the channel of each of the mobile platforms 121 to 123 is sufficient, and thus, there is no problem in performing the mission, it is not necessary to adjust the bandwidth allocated by the operating terminal 110. On the other hand, when the bandwidths allocated to the channels of all of the mobile platforms 121 to 123 are not greater than bandwidths required for the channels of all of the mobile platforms 121 to 123 to perform the respective missions, it is necessary to adjust the bandwidth of the frequency band for the mobile platforms 121 to 123 efficiently. If it is necessary to adjust the bandwidth, a request to reallocate bandwidths is sent to the operating terminal 110. Since it is important to carry on the missions of the mobile platforms 121 to 123, no request to reallocate the bandwidth is sent if the channels of all the mobile platforms 121 to 123 currently have sufficient bandwidths to perform their missions. Meanwhile, if a bandwidth required for a channel of a particular one of the mobile platforms 121 to 123 becomes greater than a previously allocated bandwidth, this mobile platform may send a request to reallocate a bandwidth to the operating terminal 110 so that a bandwidth of a channel of another one of the mobile platforms 121 to 123 that currently has a sufficient bandwidth may be reduced to allow this mobile platform to have an increased bandwidth.

It is possible to reallocate bandwidths quickly since the mobile platforms 121 to 123 send a request to reallocate bandwidths to the operating terminal 110 by using the current performance information about the mobile platforms 121 to 123 (bottom-top manner), rather than that the operating terminal 100 determines whether to reallocate bandwidths (top-bottom manner). In this manner, the operating terminal 110 performs remote control over each of the mobile platforms 121 to 123 without a burden to determine whether to reallocate bandwidths, and the mobile platforms 121 to 123 determine whether to reallocate bandwidths. In this manner, loads and resources can be shared between the mobile terminals 121 to 123, allowing for quick and efficient processing.

Figure 3:
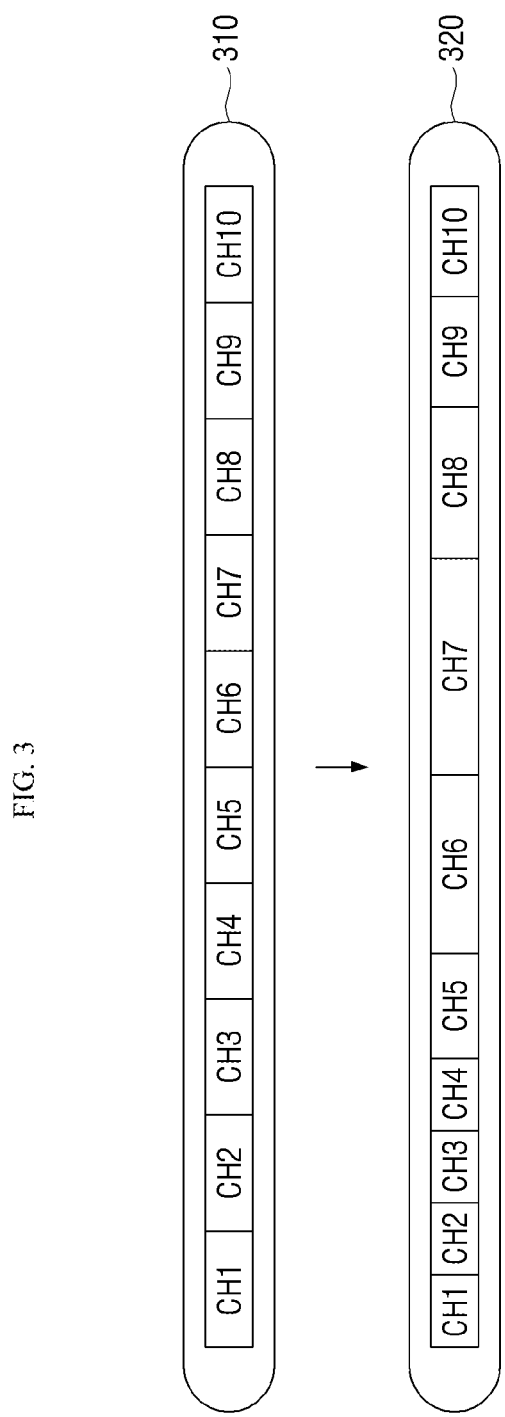
FIG. 3 is a diagram for illustrating reallocation of bandwidths.

The operating terminal 110 receives a request from the mobile platforms 121 to 123 and adjusts and reallocates the bandwidth of the channel of each of the mobile platforms 121 to 123 in response to the request. As shown in FIG. 3, bandwidths previously allocated to channels 310 are reallocated differently for different channels according to one or more requests to reallocate the bandwidths. The previously evenly divided and allocated bandwidths may be reallocated depending on the priorities, such as Channel 7 (CH7)> Channel 6 (CH6)>Channel 8 (CH8)>Channels 5, 9 and 10 (CH5, 9 and 10)>Channels 1, 2, 3 and 4 (CH1, 2, 3 and 4). In reallocating the bandwidths, the operating terminal 110 may determine whether it is possible to reallocate the bandwidths according to the received requests, and then, may reallocate the bandwidths accordingly if determined that it is possible to do so. If it is determined that it is not possible to reallocate the bandwidths because a new mission is assigned or the current communication environment does not allow so, the operating terminal 110 may send a response to the mobile platform that has sent the request to notify that reallocation is not possible. When the mobile platform 121 to 123 receives the response, it may send again another request to reallocate a bandwidth derived by using the current performance information about the mobile platforms 121 to 123 to the operating terminal 110.

The mobile platforms 121 to 123 may include the mobile platform 121 that receives performance information about the other mobile platforms 122 and 123, and sends to the operating terminal 110 a request to reallocate a bandwidth according to the received performance information and its own performance information. The mobile platform 121 may be responsible for sending the request to the operating terminal 110. The mobile platform 121 may be a designated mobile platform as a master mobile platform. Alternatively, the mobile platform 121 may be simply a mobile platform that has received performance information about all of the mobile platforms 121 to 123 controlled by the operating terminal 110 in the process of sending and receiving performance information among the mobile platforms 121 to 123.

Once the mobile platform 121 receives the performance information about all of the mobile platforms 121 to 123, it may send the request to the operating terminal 110. Herein, the performance information about the mobile platforms 121 to 123 includes information about at least one of a type of mission, a mode of driving, a current situation, whether an event has occurred, without being limited thereto. Specifically, the performance information may include information about a mission assigned, a current driving mode, a current situation or whether a certain event has occurred. The performance information may further include other information necessary for reallocating bandwidths.

The bandwidths of the channels for the mobile platforms 121 to 123 included in the request may be differentially reallocated to the channels for the mobile platforms 121 to 123 by their priorities according to the current performance information about the mobile platforms 121 to 123.

The priorities may be determined depending on the type of mission, the current driving mode, etc. included in the performance information about the mobile platforms 121 to 123. As an example where the missions include reconnaissance and shooting, and the driving modes include remote-controlled driving and autonomous driving, priorities may be determined as shown in Table 1 below:

TABLE 1

| Driving mode/mission | Mission | | |
|---|---|---|---|
| | Reconnaissance | Shooting | None |
| Remote-controlled driving | 2 | 1 | 3 |
| Autonomous driving | 5 | 4 | 6 |
| Idle | 8 | 7 | 9 |

The remote-controlled driving requires more bandwidth than the autonomous driving because an operator has to perform the remote-controlled driving while watching video in real-time. In addition, in the remote-controlled driving mode, when shooting is carried out while looking at an image, image signals and shooting control signals have to be sent/received simultaneously, and thus, a greater bandwidth may be required than when mere reconnaissance is carried out. Therefore, the priorities ranging from 1 to 9 may be given according to whether a mobile platform is in the remote-controlled driving mode, in the autonomous driving mode or in an idle mode, whether it is performing a reconnaissance mission, a shooting mission, or no mission, etc. The bandwidths may be allocated differently by the priorities. A bandwidth may be allocated first to a channel of a mobile platform having the highest priority, and then, the remaining bandwidths may be allocated to a channel of another mobile platform having the next priority as required. In allocating the bandwidths by the priorities, if the sum of the allocated bandwidths is greater than the overall bandwidth, the bandwidths allocated to the channels of the mobile platforms, respectively, may be reduced by a ratio, possibly according to priorities, or different ratios. Alternatively, the bandwidth of a channel of a mobile platform having a low priority may be reduced or the minimum bandwidth required for carrying out a mission may be allocated to it. The minimum bandwidth may refer to the bandwidth required to maintain communications. Moreover, when a plurality of mobile platforms transmit videos but it is difficult to transmit the videos simultaneously, the bandwidth necessary for transmitting the videos may be sequentially allocated to a channel of each of the mobile platforms. Alternatively, the amount of transmitted data of information can be reduced by converting a video into an image and the image into a text. Besides, a variety of ways of allocating bandwidths according to priority can be employed.

The priorities according to the performance information about the mobile platforms 121 to 123 may be generated and recorded in a priority table, and may be transmitted to the mobile platforms 121 to 123 from the operating terminal 110, or may be stored in the mobile platforms 121 to 123. The operating terminal 110 may store the priority table in the storage 113. If the mobile platform 121 is a fixed master mobile platform, then only the mobile platform 121 may store the priority table. If the mobile platform 121 is not a fixed master mobile platform, all of the mobile platforms 121 to 123 may store the priority table.

The events included in the performance information about the mobile platforms 121 to 123 may include an emergency situation and/or an urgent mission. If any of the events occurs, the mobile platform may have the highest priority. The events refer to abnormal situations which does not occur in typical missions, and include situations where a greater bandwidth is required than before. The events may include a situation where an enemy attacks while carrying out reconnaissance, a situation where it is required to change a route quickly as an obstacle is found unexpectedly, or a situation where an urgent mission is received from the operating terminal 110, not being limited thereto. When an event occurs, a mobile platform positioned where the event has occurred may have the highest priority. The mobile platform having the highest priority may be allocated a sufficient bandwidth, so that it can escape from the situation where an event has occurred or it can perform an emergency mission reliably. In addition, the events may include a situation where a mobile platform cannot move or perform a mission. If a mobile platform can no longer move as it is broken or out of order by an attack from an enemy, it is not necessary to perform communications to move the mobile platform. When this happens, the mobile platform may have the lowest priority or the minimum bandwidth. It is also possible to disconnect communications to eliminate the channel and the bandwidth allocation with respect to this mobile platform.

Figure 4:
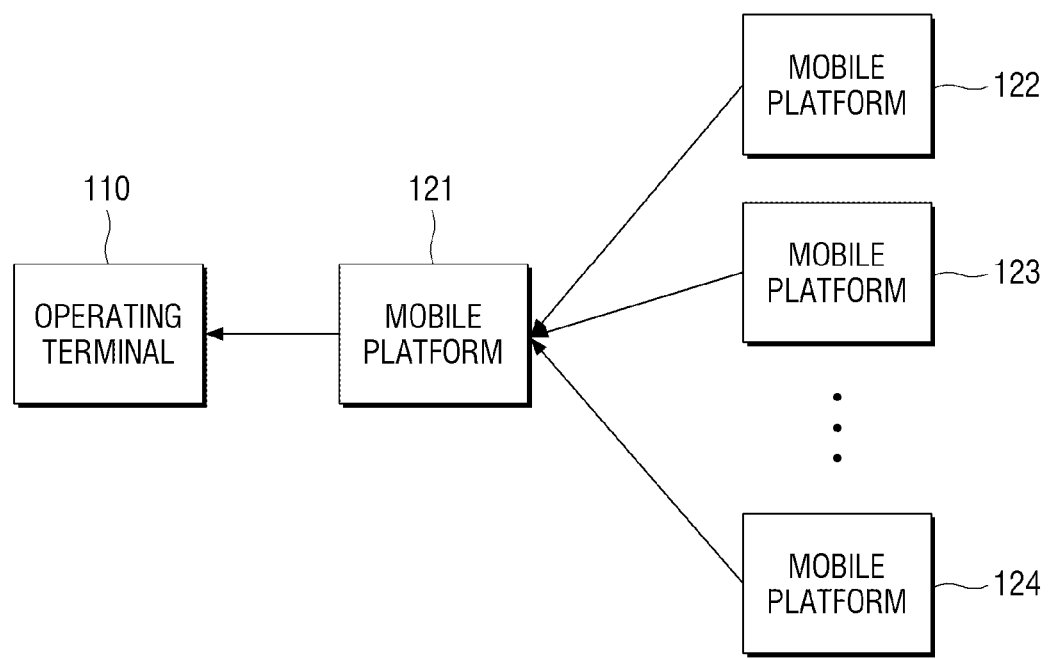
FIGS. 4 and 5 are diagrams for illustrating processes of transmitting performance information about mobile platforms to a first mobile platform.
Figure 5:
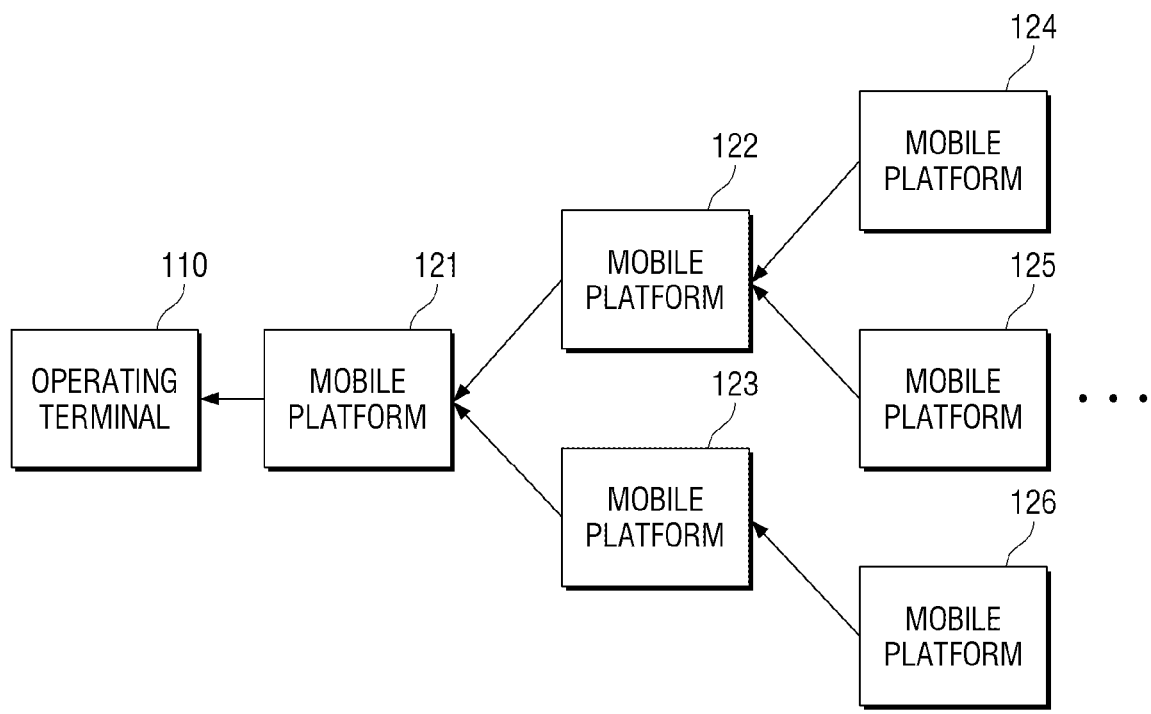

The mobile platform 121 may receive performance information about each of the mobile platforms 122 to 124 through communications with these mobile platforms as shown in FIG. 4, or may collect performance information about the mobile platforms 122 to 126 in the form of a tree, as shown in FIG. 5. The tree of the mobile platforms 121 to 126 may be determined according the distances between them. The performance information may be collected from a mobile platform that is the farthest from the mobile platform 121 to a mobile platform that is closest to the mobile platform 121, and the performance information may be finally sent to the mobile platform 121. As shown in FIG. 5, when the performance information is received in the form of a tree, it is possible to receive the performance information quickly.

The mobile platform 121 may periodically receive performance information about the other mobile platforms 122 to 126. Alternatively, the mobile platform 121 may receive the performance information about the other mobile platforms 122 to 126 only when it is necessary to reallocate bandwidths, such as when there is a change in the priorities of the mobile platforms 121 to 126 or the bandwidth of each of the mobile platforms 121 to 126 is increased to become greater than the entire bandwidth used by the operating system 100. The mobile platform 121 may send a request to reallocate bandwidths to the operating terminal 110 if it is necessary to adjust the bandwidths according to the received performance information about the mobile platforms 122 to 126 and its own performance information.

The performance information may be transmitted between the mobile platforms 121 to 126 via an ad-hoc network. The performance information may be transmitted between the mobile platforms 121 to 126 by communications only therebetween without intervention of the operating terminal 110.

The performance information may be transmitted between the mobile platforms 121 to 126 by using a part of one or more of the channels of the mobile platforms 121 to 126 or by using a different communication scheme from the communication scheme of the operating terminal 100. When the performance information is transmitted between the mobile platforms 121 to 126 by using a part of one or more of the channels, it may interfere with communications with the operation terminal 110. Therefore, only simple information about or a part of the performance information may be transmitted and received between mobile platforms positioned within a range that does not interfere with communications between the operation terminal 110 and the mobile platforms 121 to 126. For example, each of the mobile platforms 122 to 126 may send only information about its priority to the mobile platform 121. When the priorities may range from 1 to 9, only a 4-bit signal is to be transmitted, so that the performance information can be sent to the mobile platform 121 using a small bandwidth.

Further, a communication scheme different from the communication scheme of the operating terminal 110 may be employed. A communication scheme that can be communicated between the mobile platforms 121 to 126 may be employed. A variety of communication schemes such as Bluetooth, radio-frequency identification (RFID) and near-field communication (NFC) may be employed. By using a communication scheme different from the communication scheme with the operating terminal 110, communications between the mobile platforms 121 to 126 may not interfere with communications of the mobile platforms 121 to 126 with the operating terminal.

The bandwidth reallocation can be applied not only to the mobile platforms operated by a single operating terminal but also to a system where a communication interference occurs between a single operating terminal and operating groups each of which is formed of an operating terminal and a plurality of mobile platforms.

Figure 6:
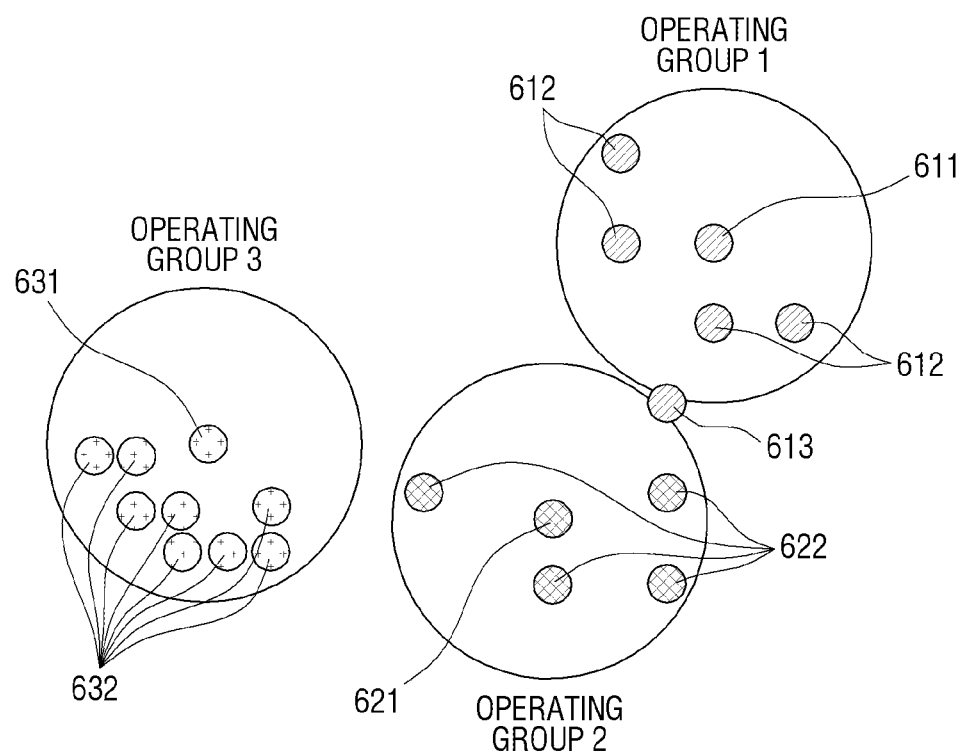
FIGS. 6 and 7 are diagrams for illustrating an example where a communication interference occurs between a plurality of operating groups.

As shown in FIG. 6, an operating terminal 611 and a plurality of mobile platforms 612 and 613 receiving missions from the operating terminal 611 forms an operating group 1, an operating terminal 621 and a plurality of mobile platforms 622 receiving missions from the operating terminal 621 forms an operating group 2, and an operating terminal 631 and a plurality of mobile platforms 632 receiving missions from the operating terminal 631 forms an operating group 3. When communications used by the operating group 1 interfere with communications used by the operating group 2, a bandwidth may be reallocated to a channel of each of the mobile platforms 612 and 613 according to the performance information about the mobile platforms 612 and 613 of the operating group 1 and mobile platforms 622 of the operating group 2.

Figure 7:
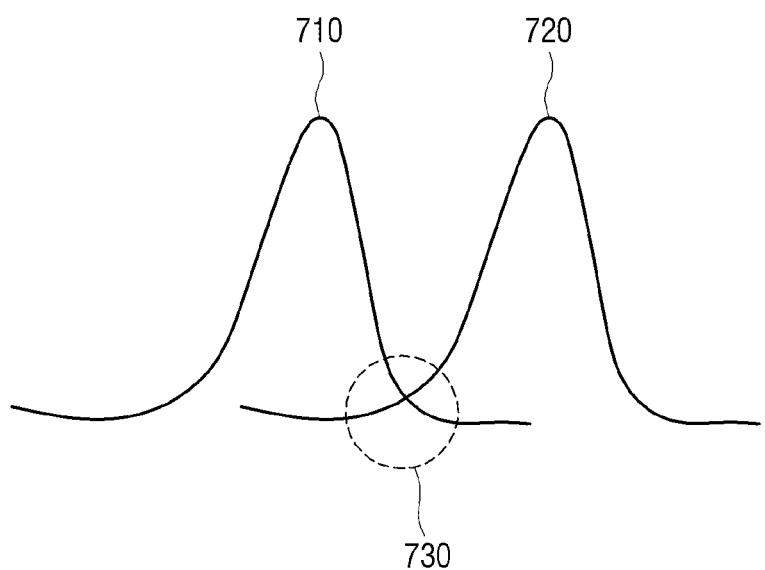

The operating groups 1 to 3 shown in FIG. 6 may use the same frequency band, which does not interfere with one another if the operating groups 1 to 3 are spaced apart from one another by more than a certain distance. When ranges of communications do not overlap with each other like the operating group 1 and the operating group 3, there is no problem. However, when the mobile platform 613 is at a location where the ranges of communications overlap with each other, like the operating group 1 and the operating group 2, an interference occurs in communications with the mobile platform 613. Even if the frequencies or bandwidths used in the operating groups 1 and 2 are different, there may occur a communications interference 730 in a frequency bandwidth 710 used in the operating group 1 and a frequency bandwidth 720 used in the operating group 2 as shown in FIG. 7.

If the operating terminal 611 or one of the mobile platforms 612 of the operating group 1 detects an identifier different from an identifier of the operating group 1, it may be determined that there occurs communication interference in communications with the operating group 2. In each of the operating groups 1 to 3, communications may be carried out by using a service set ID (SSID). When a signal having a different SSID is received, it may be determined that a communication interference has occurred with another operating group.

As such, when a communication interference occurs between the operating groups 1 and 2, a bandwidth may be reallocated to a channel of each of the mobile platforms according to the performance information about the mobile platforms 612 and 613 of the operating group 1 and the mobile platforms 622 of the operating group 2. The process of reallocating the bandwidths to the mobile platforms 612, 613 and/or 622 according to the performance information about the mobile platforms 612, 613 and/or 622 may be substantially identical to the process of reallocating the bandwidths to the mobile platforms within a single processing group as described above, and may further include determining the priorities of the operating groups 1 and 2 to reallocate bandwidths based on the priorities.

Figure 8:
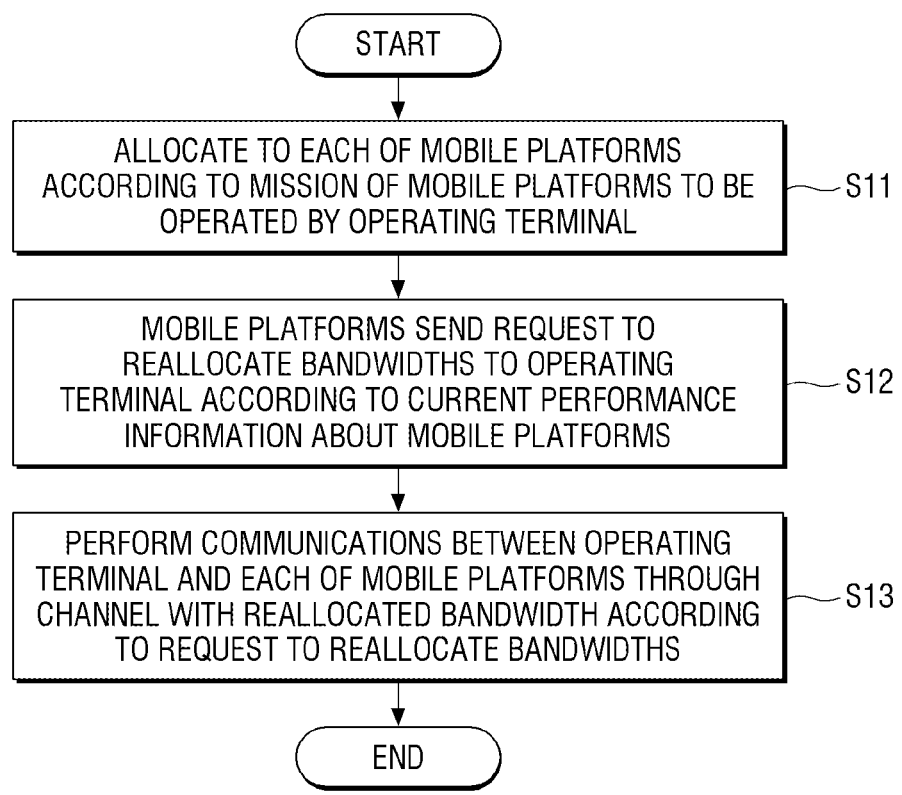
FIG. 8 is a flowchart for illustrating a method of operating a plurality of mobile platforms according to an exemplary embodiment.
Figure 9:
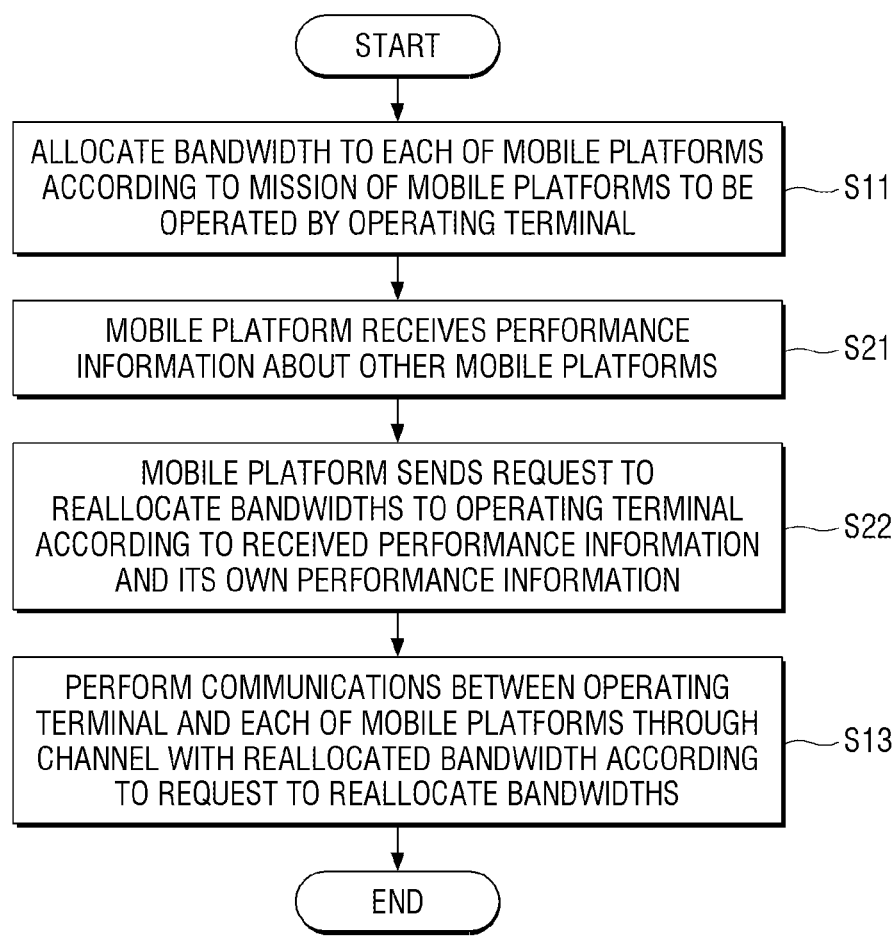

FIG. 8 is a flowchart for illustrating a method of operating a plurality of mobile platforms according to an exemplary embodiment. FIGS. 9 and 10 are flowcharts for illustrating a method of operating a plurality of mobile platforms according to an exemplary embodiment. The method according to the exemplary embodiment is performed by the operating system 100 described above with reference to FIGS. 1 to 7, and therefore, each step will be described briefly to avoid redundancy.

In order to operate a plurality of mobile platforms using a limited frequency band, a bandwidth is allocated to a channel of each of the mobile platforms that an operating terminal is to operate according to its mission (S11).

While a mobile platform carries out a mission assigned by the operating terminal by using a channel, the mobile platform sends a request to reallocate a bandwidth of the channel to the operating terminal according to current performance information about the mobile platforms (step S12).

Once the request is transmitted to the operating terminal and processed, the operating terminal and each of the mobile platforms communicate with one another through a channel with a bandwidth reallocated according to the request (step S13).

The bandwidths may be reallocated differently to the mobile platforms by priorities according to the performance information about the mobile platforms. The priorities may be generated and recorded in a priority table and transmitted to the mobile platforms from the operating terminal or may be stored in the mobile platforms.

The performance information may include at least one of a type of a mission, a driving mode, a current situation, and an occurrence of an event, not being limited thereto. The event may include an emergency situation and/or an urgent mission. If any of the events occurs, the mobile platform may have the highest priority.

The operation S12 of sending the request to the operating terminal may include receiving, by a first mobile platform among the mobile platforms, the performance information about the other mobile platforms (S21), and sending, by the first mobile platform, the request to reallocate the bandwidth of the channel to the operating terminal according to the received performance information and its own performance information (S22). The performance information may be transmitted between the mobile platforms by using a part of one or more of the allocated channels or by using a different communication scheme from the communication scheme of the operating terminal.

The operating terminal and the plurality of mobile platforms receiving the missions from the operating terminal may form a first operating group. When a number of operation groups perform their missions, it is determined whether a communication interference occurs between communications used by the first operating group and communications used by a second operating group (S31). If it is determined that there is a communication interference, a bandwidth is reallocated to a channel of each of the mobile platforms according to the performance information about the mobile platforms of the first processing group and the mobile platforms of the second operating group (S32). The operating terminal and each of the mobile platforms can communicate with each other through a channel with the reallocated bandwidth (S33).

If the operating terminal or one of the mobile platforms of the first operating group detects an identifier different from an identifier of the first operating group, it may be determined that there occurs a communication interference in communications with another operating group such as the second operating group.

FIG. 11 is a flowchart for illustrating a method of operating a plurality of mobile platforms according to an exemplary embodiment. The method may include deciding the number of operating robots (S41), allocating control center missions and channels to the operating robots (S42), requesting a bandwidth appropriate for a mission and a situation of each of the operating robots (S43), determining priorities of the missions (S44), and performing the missions based on the bandwidths allocated to the channel of the operating robots (S45).

By operating a plurality of mobile platforms as described above, an operator can operate a plurality of unmanned systems within a limited wireless communications frequency. This can be applied to both UGVs and UAVs. It is possible to operate as many unmanned systems as possible by changing software technology based on an existing operating system. By using refining the form of data, the communication reliability can be improved by dividing it more efficiently. In addition, by appropriately combining ground mobile robots and aerial mobile robots having different communication ranges to expand the communications ranges, it is possible to operate a larger number of unmanned systems in a wider range. As more experimental values are obtained, errors that might occur in the existing logic can be greatly reduced. In addition, various effects can be expected by changing only some logic, e.g., by providing a master device or by allocating a separate communications frequency within a group.

The exemplary embodiments according to the present invention are implemented in a form of program commands capable of being performed through various computer components to thereby be recordable in a computer-readable recording medium. The computer-readable medium may include program instructions, data files, data structure or the like alone or a combination thereof. The program instructions stored on the medium may be ones specially configured for the present disclosure or any ones well known and available to those skilled in the field of computer software. Examples of the computer-readable storage medium may include magnetic media such as a hard disk, a floppy disk and a magnetic tape; optical media such as a compact disc read-only memory (CD-ROM) and a digital versatile disk (DVD); magneto-optical media such as a floptical disk; and hardware devices specially configured to store and execute program instructions, such as a read-only memory (ROM), a random access memory (RAM), a flash memory or the like. In addition, the computer-readable storage medium may be implemented in the form of a carrier wave, e.g. transmission via Internet. In addition, the computer-readable storage medium may be distributed in computer systems connected with one another over a network, such that computer-readable codes may be stored and executed in a distributed manner. Functional programs, codes and code segments for embodying the present disclosure may be easily deduced by computer programmers in the art. Examples of the program instructions may include machine language codes such as ones being made by compilers as well as high-level language codes capable of being executed by computers using interpreters or the like. The hardware devices may be configured to be operated as one or more software modules to perform operations according to the exemplary embodiments, or vise versa.

It will be evident to those skilled in the art that various modifications and changes may be made to the above embodiments without departing from the technical idea or the gist of the inventive concept. Therefore, it should be understood that the above-mentioned embodiments are not limiting but illustrative in all aspects. It should be understood that the drawings and the detailed description are not intended to limit the present disclosure to the particular forms disclosed herein, but on the contrary, the intention is to cover all modifications, equivalents, and alternatives falling within the spirit and scope of the inventive concept as defined by the appended claims.

What is claimed is:

1. An operating system configured to operate a plurality of mobile platforms installed on a plurality of vehicles, respectively, by using a frequency band, the system comprising:
   an operating terminal configured to allocate a bandwidth to a channel of each of the mobile platforms according to a mission of each of the mobile platforms to perform, the channel being used for the operating terminal to perform communications with each of the mobile platforms; and
   the plurality of mobile platforms each of which is configured to receive the mission from the operating terminal, and at least one of the plurality of mobile platforms configured to send a request to adjust and reallocate the bandwidth to the channel based on performance information about the mobile platforms that is obtained by the at least one of the plurality of mobile platforms,
   wherein the bandwidth is reallocated in response to the request,
   wherein the performance information comprises a driving mode of at least two vehicles from among the plurality of vehicles on which a mobile platform from among the plurality of mobile platforms is respectively installed,
   wherein the at least two vehicles comprise a first vehicle and a second vehicle, and the performance information indicates that the driving mode of the first vehicle is a remote-controlled driving mode and the driving mode of the second vehicle is an autonomous driving mode, and
   wherein a bandwidth allocated for the remote-controlled driving mode of the mobile platform is higher than a bandwidth allocated for the autonomous driving mode of the mobile platform.

2. The system of claim 1, wherein the operating terminal is configured to adjust and reallocate the bandwidth according to a priority of each of the mobile platforms generated based on the performance information about the mobile platforms, such that a priority of the first vehicle is higher than a priority of the second vehicle based on the performance information indicating that the driving mode of the first vehicle is the remote-controlled driving mode and the driving mode of the second vehicle is the autonomous driving mode.

3. The system of claim 2, wherein the mobile platforms have respective priorities generated based on the performance information about the mobile platforms, and
   wherein the priorities are generated and recorded in a priority table, and the priority table is transmitted to at least one of the mobile platforms from the operating terminal or is stored in the operating terminal.

4. The system of claim 1, wherein the performance information further comprises at least one of a type of the mission, a current situation of the at least two vehicles, and information on whether an event occurs with respect to the at least two vehicles.

5. The system of claim 4, wherein the performance information comprises the information on whether the event occurs with respect to the at least two vehicles, the event comprises an emergency situation or an urgent mission, and a highest priority is given to a mobile platform, among the mobile platforms, where the event occurs.

6. The system of claim 1, wherein the mobile platforms comprise a first mobile platform configured to receive performance information about the other mobile platforms, among the mobile platforms, and to send the request to adjust and reallocate bandwidths to channels of the mobile platforms according to the received performance information and performance information about the first mobile platform.

7. The system of claim 6, wherein the performance information of the mobile platforms is transmitted between the mobile platforms by using a part of one or more of channels of the mobile platforms or by using a communication scheme different from a communication scheme of the operating terminal.

8. The system of claim 1, wherein the operating terminal and the mobile platforms receiving missions from the operating terminal from a first operating group, and
wherein the operating terminal is configured to adjust and reallocate bandwidths to channels of the mobile platforms, respectively, based on the performance information about the mobile platforms of the first operating group and at least one another mobile platform of a second operating group which uses communications that interfere with communications used by the first operating group, based on determining by at least one of the operating terminal and the mobile platforms of the first operating group that there is a communication interference by the second operating group.

9. The system of claim 8, wherein it is determined that there is the communication interference by the second operating group based on the operating terminal or at least one of the mobile platforms of the first operating group detecting an identifier different from an identifier of the first operating group.

10. A method of operating a plurality of mobile platforms installed on a plurality of vehicles, respectively, by using a frequency band, the method comprising:
allocating, by an operating terminal, a bandwidth to a channel of each of the mobile platforms according to a mission of each of the mobile platforms to perform;
sending, by at least one of the plurality of mobile platforms, a request to adjust and reallocate the bandwidth to the channel to the operating terminal based on current performance information about the mobile platforms that is obtained by the at least one of the plurality of mobile platforms;
performing communications between the operating terminal and each of the mobile platforms through the channel having the reallocated bandwidth in response to the request,
wherein the performance information comprises a driving mode of at least two vehicles from among the plurality of vehicles on which a mobile platform from among the plurality of mobile platforms is respectively installed,
wherein the at least two vehicles includes a first vehicle and a second vehicle, and the performance information indicates that the driving mode of the first vehicle is a remote-controlled driving mode and the driving mode of the second vehicle is an autonomous driving mode, and
wherein a bandwidth allocated for the remote-controlled driving mode of the mobile platform is higher than a bandwidth allocated for the autonomous driving mode of the mobile platform.

11. The method of claim 10, wherein the bandwidth is adjusted and reallocated according to a priority of each of the mobile platforms generated based on the performance information about the mobile platforms, such that a priority of the first vehicle is higher than a priority of the second vehicle based on the performance information indicating that the driving mode of the first vehicle is the remote-controlled driving mode and the driving mode of the second vehicle is the autonomous driving mode.

12. The method of claim 11, wherein the mobile platforms have respective priorities generated based on the performance information about the mobile platforms, and
wherein the priorities are generated and recorded in a priority table, and the priority table is transmitted to at least one of the mobile platforms from the operating terminal or is stored in the operating terminal.

13. The method of claim 10, wherein the performance information further comprises at least one of a type of the mission, a current situation of the at least two vehicles, and information on whether an event occurs with respect to the at least two vehicles.

14. The method of claim 13, wherein the performance information further comprises the information on whether the event occurs with respect to the at least two vehicles, the event comprises an emergency situation or an urgent mission, and a highest priority is given to a mobile platform, among the mobile platforms, where the event occurs.

15. The method of claim 10, wherein the sending the request to adjust an reallocate the bandwidth comprises:
receiving, by a first mobile platform, performance information about the other mobile platforms, among the mobile platforms; and
sending, by the first mobile platform, the request to the operating terminal based on the received performance information and performance information about the first mobile platform.

16. The method of claim 15, wherein the performance information of the mobile platforms is transmitted between the mobile platforms by using a part of one or more of channels of the mobile platforms or by using a communication scheme different from a communication scheme of the operating terminal.

17. The method of claim 10, wherein the operating terminal and the mobile platforms receiving missions from the operating terminal form a first operating group, and
wherein the method further comprises:
detecting whether there is a communication interference by a second operating group, comprising at least one another mobile platform, which uses communications that interfere with communications used by the first operating group; and
adjusting and reallocating bandwidths to channels of the mobile platforms, respectively, according to the performance information about the mobile platforms of the first operating group and the at least one other mobile platform of the second operating group, based on detecting that there is the communication interference.

18. The method of claim 17, wherein it is determined that there is the communication interference by the second operating group based on the operating terminal or at least one of the mobile platforms of the first operating group detecting an identifier different from an identifier of the first operating group.

19. An operating terminal configured to control a plurality of mobile platforms by using a frequency band, the operating terminal comprising at least one processor, a communication interface, and a memory,
   wherein the processor is configured to allocate a bandwidth to a channel of each of the mobile platforms according to a mission of each of the mobile platforms to perform, through the communication interface,
   wherein the processor is further configured to receive from at least one of the plurality of mobile platforms a request to adjust and reallocate the bandwidth to the channel based on performance information about the mobile platforms that is obtained by the at least one of the plurality of mobile platforms,
   wherein the bandwidth is reallocated in response to the request,
   wherein the performance information comprises a driving mode of at least two vehicles from among a plurality of vehicles on which a mobile platform from among the plurality of mobile platforms is respectively installed,
   wherein the at least two vehicles includes a first vehicle and a second vehicle, and the performance information indicates that the driving mode of the first vehicle is a remote-controlled driving mode and the driving mode of the second vehicle is an autonomous driving mode, and
   wherein a bandwidth allocated for the remote-controlled driving mode of the mobile platform is higher than a bandwidth allocated for the autonomous driving mode of the mobile platform.

20. The operating terminal of claim 19, wherein the performance information further comprises at least one of a type of the mission, a current situation of the at least two vehicles, and information on whether an event occurs with respect to the at least two vehicles.

* * * * *